G. O. Monroe,
Fastening for Breastpins, &c,
Nº 45,121.  Patented Nov. 15, 1864.
Fig: 1.
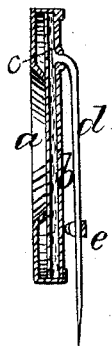
Fig: 2.
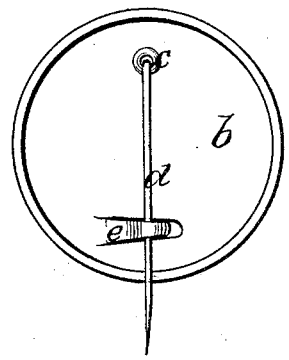
Witnesses;
John F. Gray.
Lemuel W. Serrell
Inventor;
G. O. Monroe

UNITED STATES PATENT OFFICE.

GEORGE O. MONROE, OF NEW YORK, N. Y., ASSIGNOR TO THE ARMY AND NAVY BUTTON COMPANY, OF WATERBURY, CONNECTICUT.

PIN-FASTENING FOR MEDALS, BREASTPINS, &c.

Specification forming part of Letters Patent No. 45,121, dated November 15, 1864.

*To all whom it may concern:*

Be it known that I, GEORGE O. MONROE, of the city and State of New York, have invented, made, and applied to use a certain new and useful Improvement in Pins for Attaching Medals, Breastpins, &c.; and I do hereby declare the following to be a full, clear, and exact description of the said invention, reference being had to the annexed drawings, making part of this specification, wherein—

Figure 1 is a section of a medal with my pin attached thereto, and Fig. 2 is an elevation of the back of said medal with my pin thereon.

Similar marks of reference denote the same parts.

Heretofore it has been usual to attach the pins of medals, breastpins, &c., permanently by soldering, or else by a hinge-joint provided with a stop, against which the pin came in contact before reaching the clasp, in order that it might be sprung beneath a catch or hook and remain therein. This first-named mode of attachment is very inconvenient, as the pin is so near the medal and is liable to be broken off by the act of sticking the pin into the garment. The hinge-joint is costly and only allows of motion in one direction.

The nature of my said invention consists in the introduction of a headed pin through a hole, forming a socket for said head, and the pin itself being bent near the head so as to run nearly parallel to the plate through which said hole passes. By this means the head of the pin forms a ball-joint, that allows the pin to be turned in any direction, and when the pin is pressed down to hook it under the catch said pin binds in the hole sufficiently to cause the pin to be sprung in the act of hooking it under said catch.

I also form the catch of a tongue cut from the plate of metal forming the back of the medal or breastpin and bent up into the proper shape.

In the drawings, *a* represents a medal or breastpin of any desired character, and which itself forms no part of my invention. *b* is the back plate of said medal or a plate attached to a breastpin or similar article, in which is a hole forming the socket for the head *c* of the pin *d*. This pin, it will be evident, can be turned in any direction within the limit determined by the size of opening through which the pin *d* passes, and binds in its hole, so as to be sprung under the catch *e*. This catch *e* is made as a tongue cut out of the plate *b* by a suitable die, that allows one end to still remain connected with the plate. This tongue is bent up in the proper shape to form the catch for the pin *d*.

This mode of construction renders the pin very cheap, strong, and durable, and allows for the introduction of a common-headed pin in cheap articles. It is to be understood that the pin is to be entered point first through the hole in the plate previous to the plate being secured in place.

What I claim, and desire to secure by Letters Patent, is—

1. Forming the pins of breastpins, medals, &c., of a headed pin passed through a hole or socket in the manner and for the purposes specified.

2. Forming the clasp or catch of a tongue pressed up from the plate *b* in the manner set forth.

In witness whereof I have hereunto set my signature this 24th day of September, 1864.

G. O. MONROE.

Witnesses:
 JOHN F. GRAY,
 LEMUEL W. SERRELL.